Fig.1

*Inventors*
Willard L. Baker
Adolph S. Dorosz
James R. Stewart
By their Attorney
Robert E Ross March 13, 1962 W. L. BAKER ETAL 3,024,480
SHOE HANDLING DEVICES
Filed May 12, 1960 12 Sheets-Sheet 5

March 13, 1962 W. L. BAKER ETAL 3,024,480
SHOE HANDLING DEVICES
Filed May 12, 1960 12 Sheets-Sheet 8

United States Patent Office 3,024,480
Patented Mar. 13, 1962

3,024,480
SHOE HANDLING DEVICES
Willard L. Baker, Ipswich, Adolph S. Dorosz, Beverly, and James R. Stewart, Salem, Mass., assignors to United Shoe Machinery Corporation, Boston, Mass., a corporation of New Jersey
Filed May 12, 1960, Ser. No. 28,799
18 Claims. (Cl. 12—1)

This invention relates generally to shoe machinery, and has particular reference to an automatic mechanism which is adapted to present partially fabricated shoes to a work station and remove them after a desired operation has been performed thereon.

Shoes in the process of manufacture are customarily transferred from one work station to another on storage racks from which they are manually removed by an operator and presented to the work station.

With increasing automation of shoe manufacturing machinery for performing the various operations on shoes, in many cases the operator has no function other than to place the shoe on the work station, and return it to the rack on completion of the operation by the machine.

The object of this invention is to provide a work handling mechanism which is adapted to remove partially fabricated shoes from a storage rack and transfer them to a work station, and return them to the rack after an operation, at the work station, has been completed.

A further object of the invention is to provide a work handling mechanism which is adapted to interchange work pieces between a transfer position on a storage rack and a work station, and to index the storage rack to bring another work piece to the transfer position.

A further object of the invention is to provide a work handling mechanism for transferring a series of work pieces from a storage rack to a work station, in which said mechanism has means for rotatably supporting and indexing said rack during the transfer operation.

A further object of the invention is to provide a transfer mechanism of the type described which has means responsive to the completion of the transfer cycle to actuate the shoe machine with which it is associated, and means responsive to the completion of the operation at the shoe machine to actuate the cycle of the transfer mechanism.

A further object of the invention is to provide a work handling mechanism adapted to interchange work pieces between work stations at different elevations.

Other objects of the invention will be apparent to one skilled in the art from the following description of a specific embodiment, in conjunction with the accompanying drawings, in which—

Figure 1:
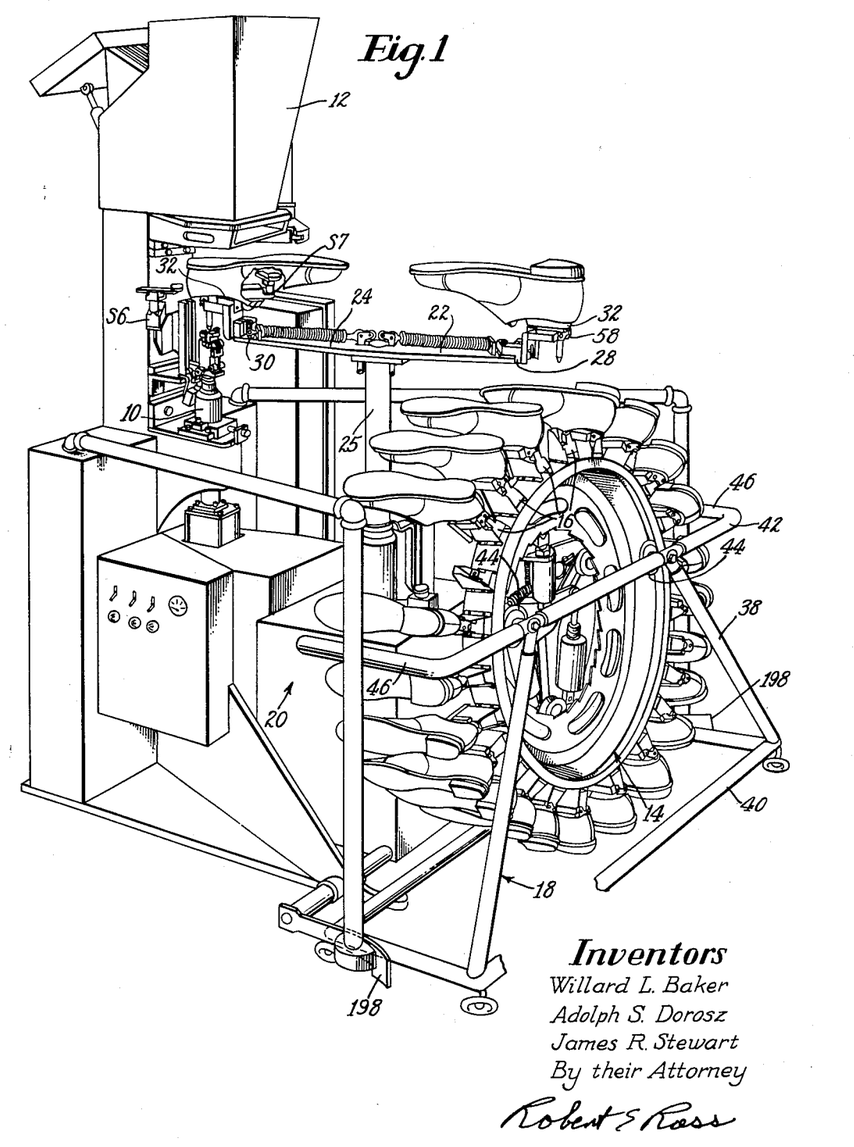
FIG. 1 is a perspective view of a shoe handling mechanism embodying the features of the invention, in operative position in front of a machine for performing a predetermined operation on partially fabricated shoes disposed on lasts.

Referring to the drawings, and particularly to FIG. 1, there is illustrated a work handling mechanism which is particularly adapted to present partially fabricated shoes disposed on lasts to a work station such as a jack 10 of a machine 12 for performing a predetermined operation on the shoe.

The work handling mechnaism comprises generally a work piece storage rack 14 having a plurality of work piece stations 16 disposed about the periphery, a rack support 18 adapted to hold the rack in a suitable operative position and to enable it to be easily transported from one machine to another, and a transfer mechanism 20 adapted to be positioned in front of the work station for interchanging work pieces between the storage rack and the work station.

For this purpose the transfer mechanism is provided with a pair of oppositely extending radial arms 22 and 24 which are fixed on a center shaft 25 which is movable vertically and rotatably on a stationary center support post 26, with work piece grasping means 28 and 30 on the outer ends thereof.

The arms 22 and 24 are operated in a predetermined cycle to interchange work pieces between the rack and the work station; to initiate the operation of the machine 12; to unlock work pieces from the rack; and to actuate the indexing mechanism of the rack to bring successive work pieces to a transfer position in a manner and by mechanism to appear hereinafter.

The lasts 32 to be handled by the machine are preferably of the geometric type as described in United States Letters Patent No. 1,948,547, granted February 27, 1934, upon an application of Laurence E. Topham, and have a positioning plate 34 disposed on the upper end of the heel cone with a thimble hole 35 extending through the plate into the heel cone. The plate 34 is provided with an undercut 36 at the heel end to cooperate with the illustrated mechanism in a manner to appear hereinafter.

The rack support 18 comprises a frame 38 having a base portion 40 with casters to permit it to be rolled easily from one machine to another, and a transverse support bar 42 having a pair of spaced rollers 44 for rotatably supporting the rack so that the plane of the work stations 16 is substantially vertical. At opposite ends of the bar 42 hand holds 46 are provided to facilitate moving the rack support from place to place, and said hand holds 46 project beyond the periphery of the rack to prevent damage to the work during handling.

The rack 14 is generally rim shaped with an internal peripheral recess 48 on the rear side to receive the rollers 44, and an inwardly extending peripheral support flange 50 on the forward side to cooperate with a portion of the transfer mechanism, as will appear hereinafter.

In the illustrated embodiment the rack is provided with an inwardly extending indexing flange 52, the innermost edge of which is provided with a series of indexing notches 54 and having a series of forwardly extending stop pins 56, each notch and each pin being associated with a work piece station 16.

Figures 12, 15:
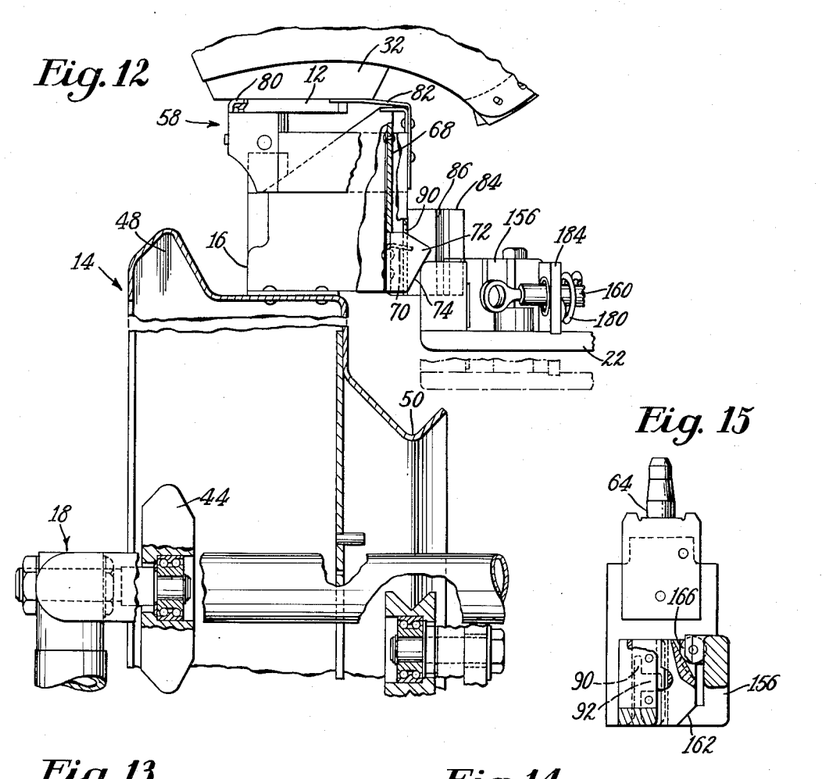
FIGS. 12 to 14 are views in side elevation of the outer end of one of the transfer arms, showing the action of the work grasping means. If it is considered that the arms are moving upwardly between the position shown in FIG. 12 and the position of FIG. 14, then these figures illustrate the action of the arms in removing a last carrier and associated last from the uppermost or transfer position of the rack. If these figures are considered in reverse order, they illustrate the action of the arms in returning a last and last carrier to the rack station.
FIG. 15 is a view in section taken on line 15—15 of FIG. 14.
Figure 13:
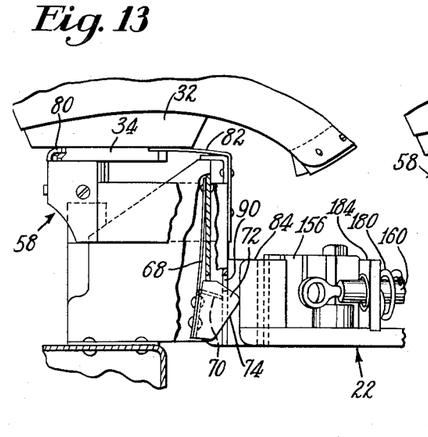

The work piece stations 16 on the periphery of the rack are each designed to receive a last carrier 58 and retain it in position during the rotation of the rack until released and lifted off by the operation of the transfer arms. For this purpose each station 16 comprises a support post 60 (FIG. 9) having a radial aperture 62 to receive an end of a guide post 64 of the last carrier, and a support plate 66, disposed forwardly of the guide post, carrying a spring latch for releasable engagement with the last carrier. The latch comprises a spring arm 68 extending radially inwardly and carrying on the free end a forwardly extending, downwardly inclined tongue 70 and a cam plate 72 having a camming surface 74 which is inclined forwardly and upwardly when the work piece station is in the uppermost or transfer position (FIG. 12).

The last carrier 58 comprises a frame portion 76 pivotally secured at one end to the medial portion of the guide post 64 and has a depending support plate 78 at the forward end. To enable the carrier to be attached to the last, an upwardly and forwardly projecting hook member 80 is provided on the frame to the rear of the guide post for engagement with the undercut 36 on the last positioning plate and a spring tongue 82 extends rearwardly from the support plate 78 for bearing against the upper surface of the last forwardly of the guide pin. The support plate 78 is provided with a forwardly projecting support block 84 which has a vertical groove 86 on one side and an upwardly and inwardly inclined groove 88 (FIGS. 10 and 11) on the opposite side for engagement by the work grasping mechanism on the transfer arms, as will be described hereinafter.

Figures 9, 10, 11:
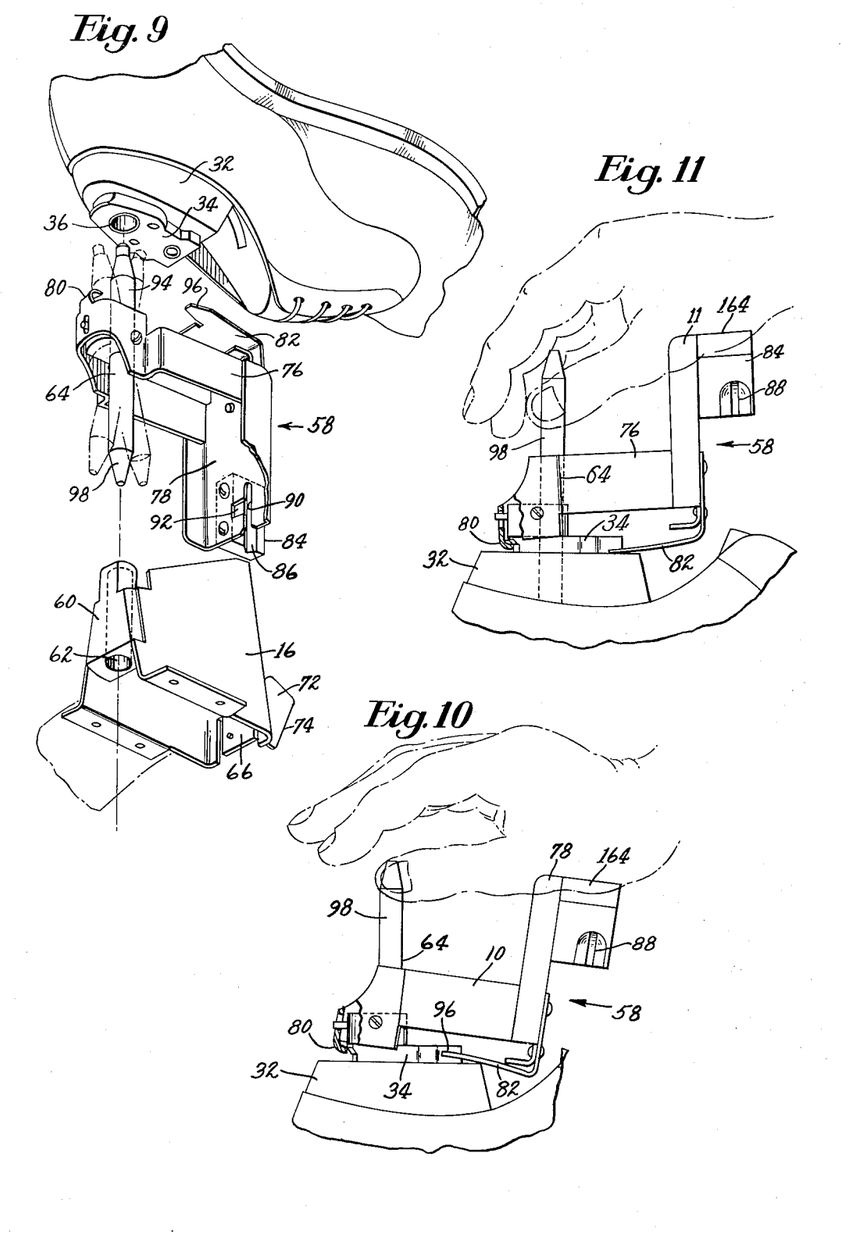
FIG. 9 is a perspective separate view of a last carrying a partially fabricated shoe, a last carrier, and a rack station oriented to the relative positions they occupy after assembly.
FIG. 10 is a view in side elevation of the last and last carrier illustrated in FIG. 9, showing the first step in their assembly.
FIG. 11 is a view similar to FIG. 10 showing the second and final step in the assembly of the last and last carrier.

To enable the carrier 58 to be releasably secured to the rack 14, a slot 90 is provided in the support plate 78 alongside the block 84 which opens to the lower edge of the plate and has a lateral aperture 92 connecting to the medial portion of the slot 90. As illustrated in FIGS. 10 and 11, the last carrier may be assembled onto the last by inserting the end 94 of the guide pin into the last thimble hole and tilting the forward end of the carrier toward the last thereby flexing the spring tongue 82 and pivoting the hook 80 to the rear so that on further movement of the guide pin into the thimble hole the hook 80 passes over the rear end of the positioning plate. When the carrier is thereafter released the tongue 82 in bearing against the last forwardly of the guide pin tends to rotate the carrier relative to the last so that the hook 80 seats in the undercut 36 of the positioning plate to retain the last and last carrier in assembly. In the illustrated embodiment the tongue 82 is provided with side extensions 96 which lie on the surface of the heel cone on opposite sides of the positioning plate thereby preventing relative rotation between the last and the last carrier.

During the operation of the illustrated mechanism, lasts and their associated carriers are removed and replaced by the transfer mechanism only from the uppermost station of the rack, by the upward and downward movement of the transfer arms. When assembled in its normal position on the rack, the end 98 of the guide post is disposed in the aperture 62 of a work station and the cam plate 72 and the tongue 70 of the latch mechanism are disposed in the slot 90 and the lateral aperture 92 respectively. The carrier may be released from the rack by pressing the cam plate 72 inwardly so that the tongue 70 is released from the aperture 92 allowing the carrier to be lifted off the work station. The carrier may be replaced on the work station by simply lowering it into position with the guide post 64 entering the opening 62. As the cam plate enters the slot 90 the inclination of the tongue 70 flexes the spring arm 68 inwardly until the tongue can snap into the aperture 92.

The transfer mechanism 20 comprises a frame 100 adapted to be secured onto the front of the machine 12 with which it is to be used. The frame 100 is provided with a shaft housing 102 which at the upper end receives the vertical shaft 25 supporting the arms 22 and 24 (FIG. 2), and a rack supporting mechanism 104 adapted to support the rack rotatably while the transfer mechanism is operating. The rack supporting mechanism 104 comprises a vertical support plate 106 carrying a crank plate 108 on one face which is rotatable about an axis 110, and three arms 112 which are joined to the crank plate at pivots 114 and extend outwardly generally tangentially to a circle drawn through the pivots (FIG. 3). The outer end of each arm carries a grooved roller 116 rotatably disposed on an axle 118 which projects through a slot 120 which extends radially from the crank plate.

The crank plate 108 is rotatable through a small angle about the axis 110 under the impetus of a piston P-1 in cylinder C-1 to move said roller axles radially inwardly and outwardly in the slots 120. When the rack carrier 18 is in the proper position in front of the transfer mechanism, as will be described hereinafter, the rollers 116, in moving radially outwardly, engage the flange 50 of the rack. The dimensions of the various parts of the mechanism are such that the axis of the crank plate is slightly higher than the axis of the rack when in position on the carrier, hence the outward movement of the arms 112 causes the rollers 116 to lift the rack slightly so that it is no longer supported by the rollers 44 in the rack carrier, but is rotatably supported by the rollers 116 of the transfer mechanism.

To provide means for initially indexing the rack into a proper starting orientation after it has been lifted off the rack carrier by actuation of cylinder C-1, a cylinder C-2 is pivotally secured at the bottom end to the front of the transfer mechanism with the upper end being attached to the crank plate 108 by a spring loaded rod 121. Piston P-2 of cylinder C-2 is provided with an indexing tool 122 positioned to move through a predetermined distance into engagement with an adjacent notch 54. Hence, regardless of the initial orientation of the rack when picked up by the mechanism, the actuation of the cylinder C–2 will rotate the rack to a predetermined angular position so that the uppermost shoe is alined to a transfer position.

Figure 7:
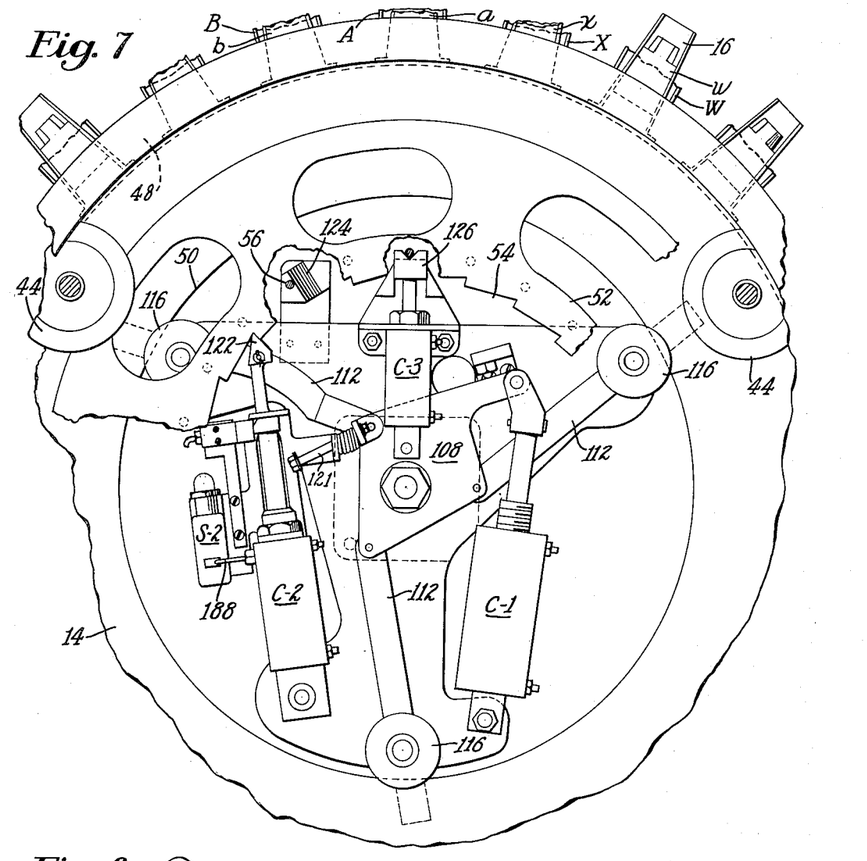
FIG. 7 is a view similar to FIG. 4 after the rack has been indexed to bring a shoe to the uppermost or transfer position, and locked against further rotation.
Figure 8:
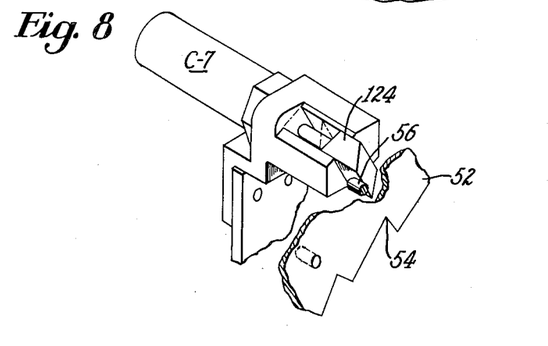
FIG. 8 is a perspective view of the mechanism for stopping the rotation of the rack imparted thereto by the indexing operation.

The mass of the rack with a full load of shoes is considerable, hence to provide means for stopping the rotation imparted by the indexing mechanism, a piston P–7 in cylinder C–7 is provided with an abutment 124 which, on actuation of the cylinder, moves into position in the path of an appropriate stop pin 56 (FIGS. 7 and 8).

To lock the rack in this position during the transfer operation, a piston P–3 in cylinder C–3 is provided with a locking block 126 having a transverse notch 128 on the forward end. Actuation of cylinder C–3 forces said block into engagement with the appropriate locking pin 56, thereby preventing rotation of the rack in either direction.

Figure 23:
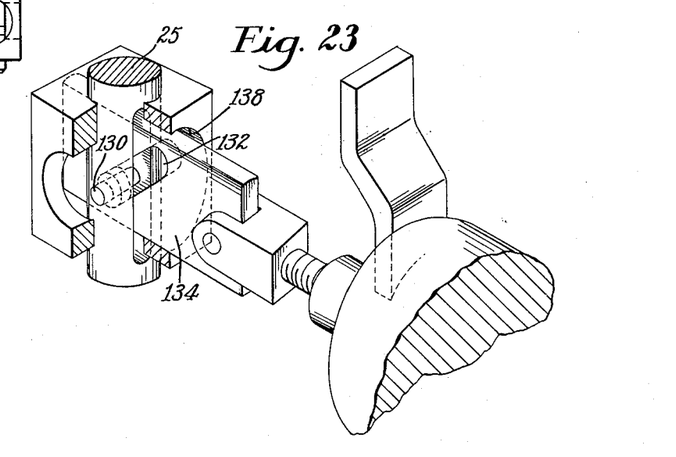
FIG. 23 is a perspective view of the center guide shaft supporting and adjustment means.

The center support shaft 25 (FIG. 23) is supported at the lower end by a transverse pin 130 disposed in an inclined slot 132 formed in a slider 134 which is movable in a guide 138 fixed to the frame to adjust the height of the guide post 26 relative to the shaft 25 for a purpose to appear hereinafter.

The shaft 25 is supported at the lower end by a plate 140 carrying a bearing 141 receiving the end of the shaft, and having a guideway 142 spaced therefrom disposed about a guide shaft 143. The plate 140 and its associated mechanism now to be described are supported by a bracket 144 and are movable vertically with the shaft 25 and the arms 22 and 24 on the center support post 26 and the guide shaft 143 under the impetus of piston P–4 secured to the bracket 144.

Figure 20:
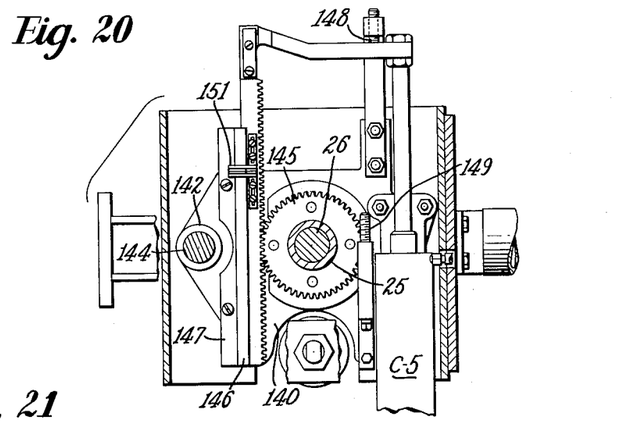
FIG. 20 is a top plan view of the arm rotating mechanism, taken as a section on line 20—20 of FIG. 2.
Figure 21:
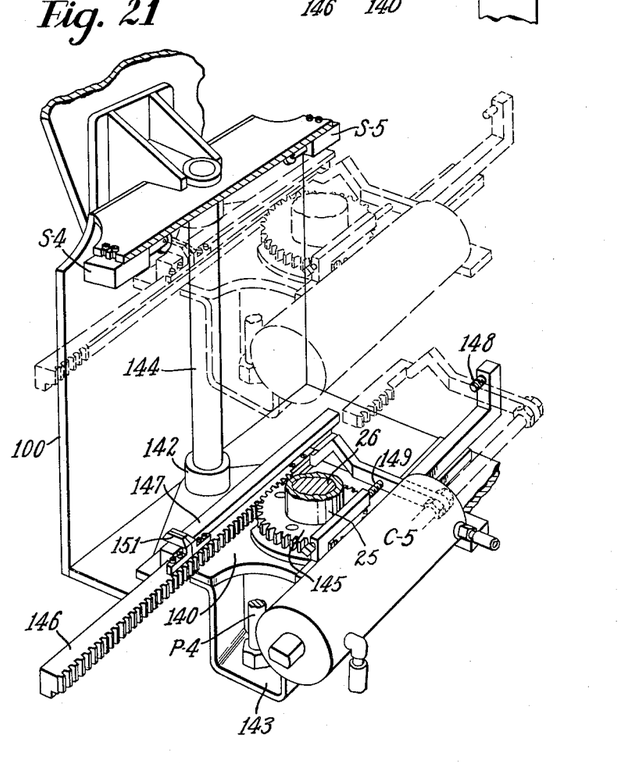
FIG. 21 is a perspective view of the arm raising and rotating mechanism, with the starting position being shown in full line, an intermediate position after the arms have been raised and rotated, and also the final position, being shown in phanton line.

To rotate the shaft 25 and consequently the arms 22 and 24 back and forth through 180°, the shaft 25 is provided at the lower end with a pinion 145 (FIGS. 2, 20 and 21) which meshes with a rack 146 movable in a slide 147 under the impetus of piston P–5 in cylinder C–5. Adjustable stops 148 and 149 are provided to limit the travel of the piston P–5 and consequently limit the angle of rotation of the arms. The rack 146 carries a double faced cam 151 to operate switches S–4 and S–5 at each end of its travel when the rack is in the uppermost position.

The work grasping means on the ends of the arms each comprises a stationary jaw 152 (FIGS. 17 and 18) having a projecting wedge 154 to seat in the vertical groove 86 of the last carrier support block 84, and a movable jaw 156 pivoted at 158 and movable toward and away from the stationary jaw 152 by means of rod 160. The movable jaw carries a beveled seat 162 (FIG. 15) on the lower portion to cooperate with a beveled lower surface 164 on the support block, and a roller 166 on the upper portion to seat in the inclined groove 88 when a block is engaged by the mechanism 28.

The rods 160 on arms 22 and 24 are actuated by levers 168 and 169 respectively which are pivoted to the center shaft 25 and have cam rollers 170 and 171 respectively which ride on the surface of the center guide shaft as the shaft 25 and the arms move up and down thereon. To actuate the levers 168 and 169, the center support post 26 is provided with a first cam track 172 so oriented that the cam roller of the arm extending toward the work piece storage rack 14 rides thereon, with a cam rise 174 positioned thereon to actuate the work grasping mechanism at the proper elevation to grasp a last carrier from the transfer position of the storage rack and remove it therefrom on upward motion of the arms, or to release a last carrier and leave it on the storage rack on downward movement of the arms.

The center support post 26 is also provided with a second cam track 176 so oriented that the cam roller of the arm extending toward the jack 10 of the machine 12 rides thereon, with a cam rise 178 positioned thereon to actuate the work grasping mechanism at the proper elevation to grasp a last carrier on the jack and remove it therefrom on upward motion of the rack carrier or to release a rack carrier and leave it on the jack on downward motion of the arms.

Figure 14:
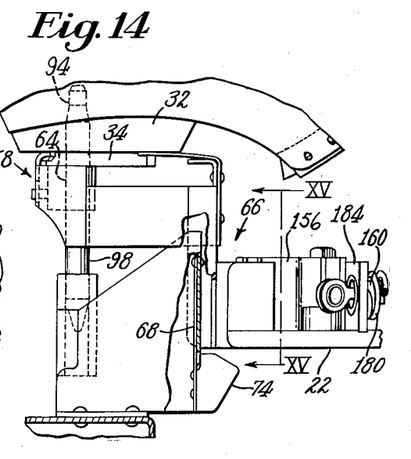
Figures 17, 18, 19:
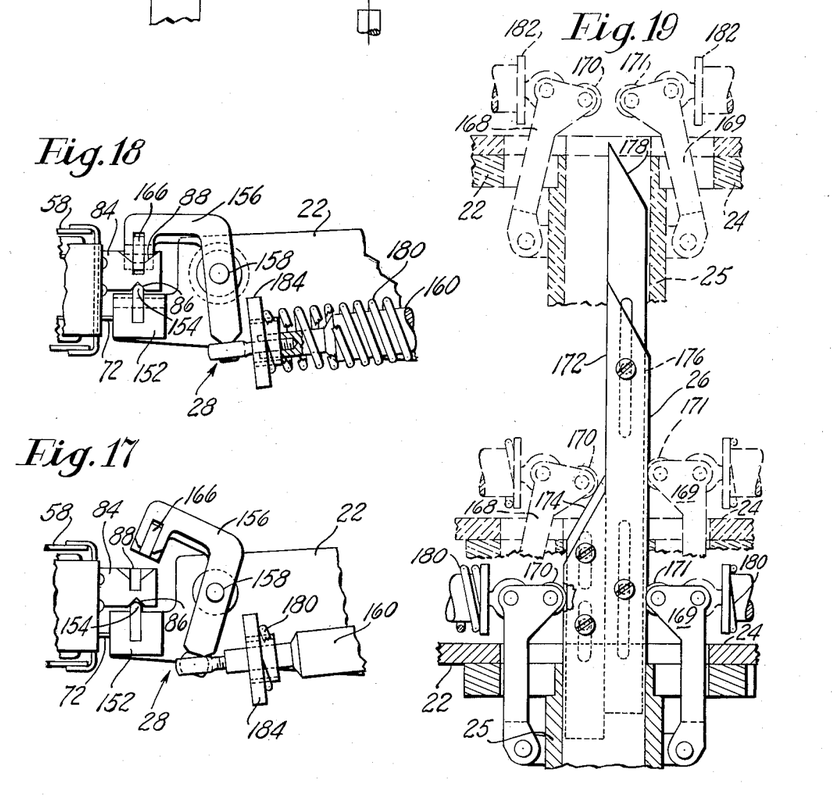
FIG. 17 is a top plan view of the work grasping mechanism in the position of FIG. 13.
FIG. 18 is a top plan view of the work grasping mechanism in the position of FIG. 14.
FIG. 19 is a view in side elevation, partly in section, showing the center guide shaft of the transfer mechanism and the associated actuating mechanism of the work grasping means, with various positions of said mechanism being shown in phantom line.

The jaws 152 and 154 are biased to the closed position, as in FIGS. 14 and 18, by means of a spring 180 which is compressed between a flange 182 on the end of the rod and a bracket 184 secured to the arm. Hence as a roller 170 moves downwardly over a cam rise, the rod 160 moves outwardly, compressing the spring 180 and opening the work gripping jaws, and when the arms move upwardly, the reverse motion of the rollers on the cam rise allows the spring to expand, gripping the support block of the last carrier.

Figure 26:
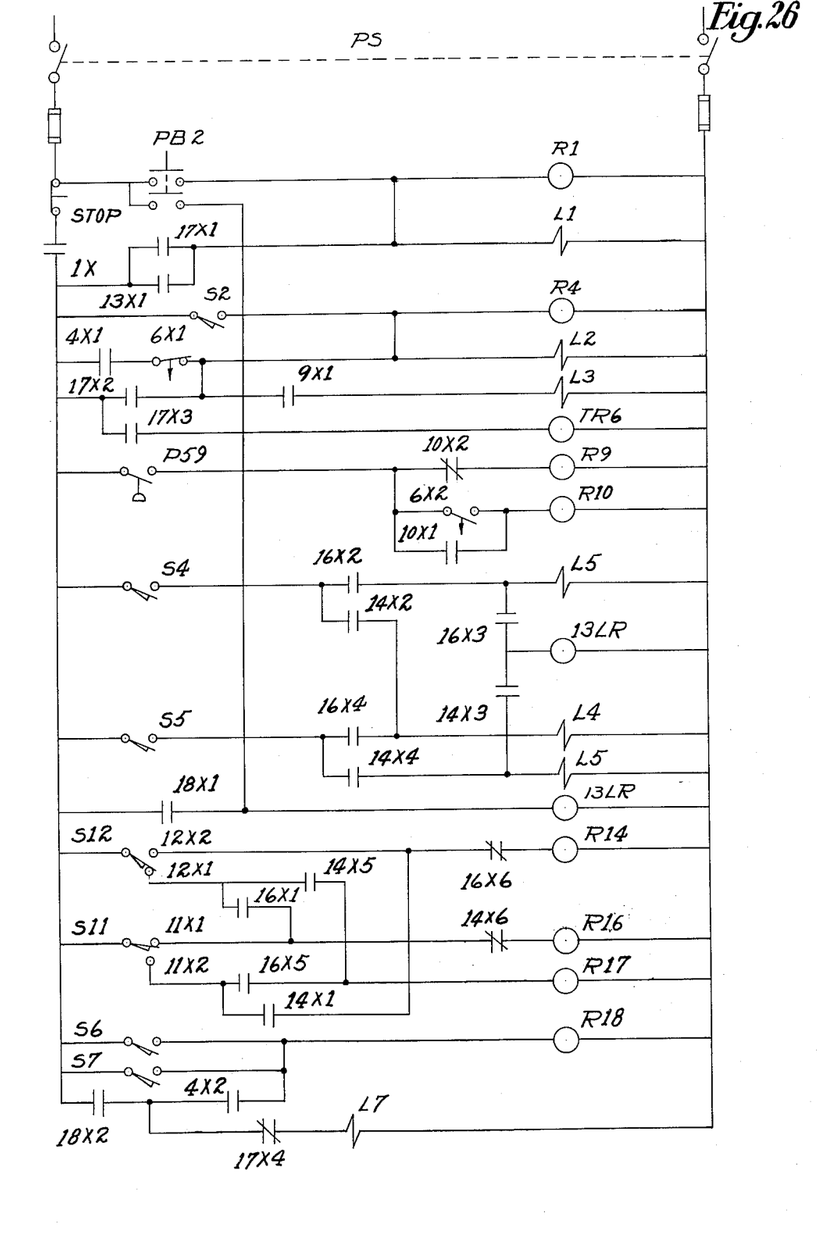
FIG. 26 is a diagram of the electrical circuit of the machine.

The pneumatic cylinders mentioned hereinbefore are controlled by pneumatic valves which are, in turn, controlled by solenoids that are actuated by an electrical circuit, as shown in FIG. 26, to cause the mechanism to operate through a predetermined cycle to remove shoes from the rack, place them in the jack 10, start the operation of the machine, index the rack to bring another shoe to a transfer position, and thereafter simultaneously interchange shoes between the rack and the work station until the desired operation has been performed on all the shoes on the rack.

Before describing in detail the complete operating sequence of the machine, it will be helpful to set out the mechanical sequence of operations imparted to the mechanisms by the electrical and pneumatic circuits.

A plurality of partially fabricated shoes disposed on lasts, each having a last carrier secured thereto, are disposed on the rack 14, which is supported by the rack carrier, as previously described. An operator positions the rack carrier against the front of the transfer mechanism which may have guides 198 to insure that the rack carrier is properly positioned.

The operator then pushes the start button PB–2, which causes the mechanism to go through the following sequence.

(1) The rack support mechanism is actuated by cylinder C–1 to lift the rack off of the rollers 44 of the rack support so that it is held rotatably on the rollers 116 of the transfer mechanism.

(2) The rack is indexed by cylinder C–2 so that a work receiving station and the shoe A carried thereby is in the uppermost or transfer position, and locked by cylinder C–3 to prevent rotation from this position.

Figure 16:
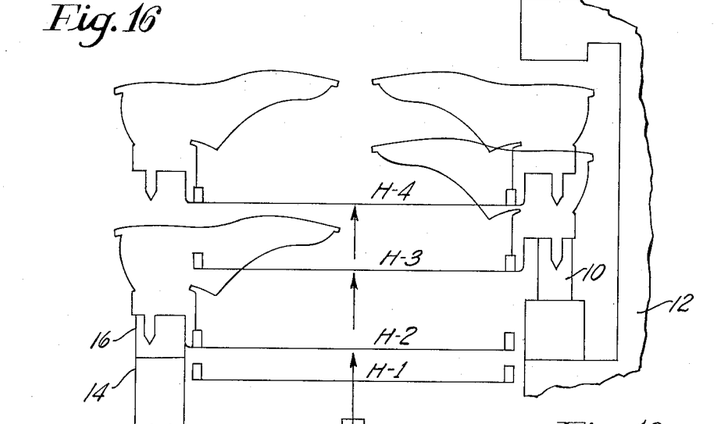
FIG. 16 is a schematic view of the transfer arms, machine jack, and storage rack, showing the relative height of the transfer arms at certain times in the transfer cycle.

(3) The arms 22 and 24, starting from lowermost level H–1 (see FIG. 16) are moved upwardly by cylinder C–4. As the arms approach the elevation of line H–2, the stationary jaw 152 engages the cam plate 72 on the latch mechanism of the rack station, forcing the spring arm 68 to flex inwardly so that the tongue 70 passes back out of the lateral aperture 92. At this time the jaws of the work gripping mechanism, actuated by the roller 170 of lever 168 riding down cam rise 174, close to grip the support block 84. Hence, as the arms pass upwardly through station H–2, the arm 22 carries the shoe, last, and last carrier upwardly off of the rack station. As the arms pass line H–3 the jaws on arm 24 close as the lever 169 passes over the cam rise 178. However, there is at this time no last carrier on the jack to be engaged thereby.

When the arms reach the uppermost level of line H–4, they are rotated clockwise, as seen from above, through 180° by cylinder C–5 so that the last carrier and shoe just removed from the rack station is positioned above the jack 10 of the machine.

The arms are then lowered by the cylinder C–4 so that the guide post 64 of the last carrier enters a suitable aperture 200 in the jack 10. As the arms continue downwardly through level H–3, the jaws on arm 22 are opened by the action of the lever 168 on cam rise 178, so that the last carrier is released. As the arms pass through level H-2, the jaws on arm 24 open due to the action of lever 169 on cam rise 174. When the arms again reach their lowermost level, H-1, piston P-3 is retracted to unlock the rack, cylinder C-2 is actuated to again index the rack to bring the next rack station, carrying shoe B, to the uppermost or transfer position, after which cylinder C-3 is again actuated to lock the rack against further rotation.

At this time the transfer mechanism becomes inactive, until the completion of the operation on shoe A at the work station, after which the arms again move upwardly and remove shoe B from the rack at level H-2, remove shoe A from the machine jack at level H-3, are rotated counterclockwise through 180° and again move downwardly. As the arms pass level H-4, the jaws on arm 24 release shoe B onto the jack, and as they pass level H-2, shoe A is released onto the rack station previously occupied by shoe B with the spring arm 68 of the rack station latching into engagement with the support plate 78 of the last carrier as previously described.

When the arms again reach level H-1, the rack is again indexed to bring shoe C to the transfer position.

The machine continues to operate through this sequence until station A of the rack, which has been empty since shoe A was removed therefrom, arrives again at the transfer position. Hence on the next cycle of the transfer mechanism no shoe will be carried into the machine as the last shoe is carried out. This fact is utilized by the control circuit of the transfer mechanism, in a manner to appear hereinafter, to stop the operation after the last shoe has been returned to the rack, and to release the rack back onto the rack carrier for removal by an operator.

The operation of the mechanism is in part controlled by switches disposed therein to be operated mechanically by various parts of the mechanism as follows:

A switch S-2 is provided on the rack pick-up mechanism, which is closed when the piston P-2 of the rack indexing cylinder C-2 is extended, by means of cam 186 (FIGS. 2 and 21) actuating lever 188.

Figure 2:
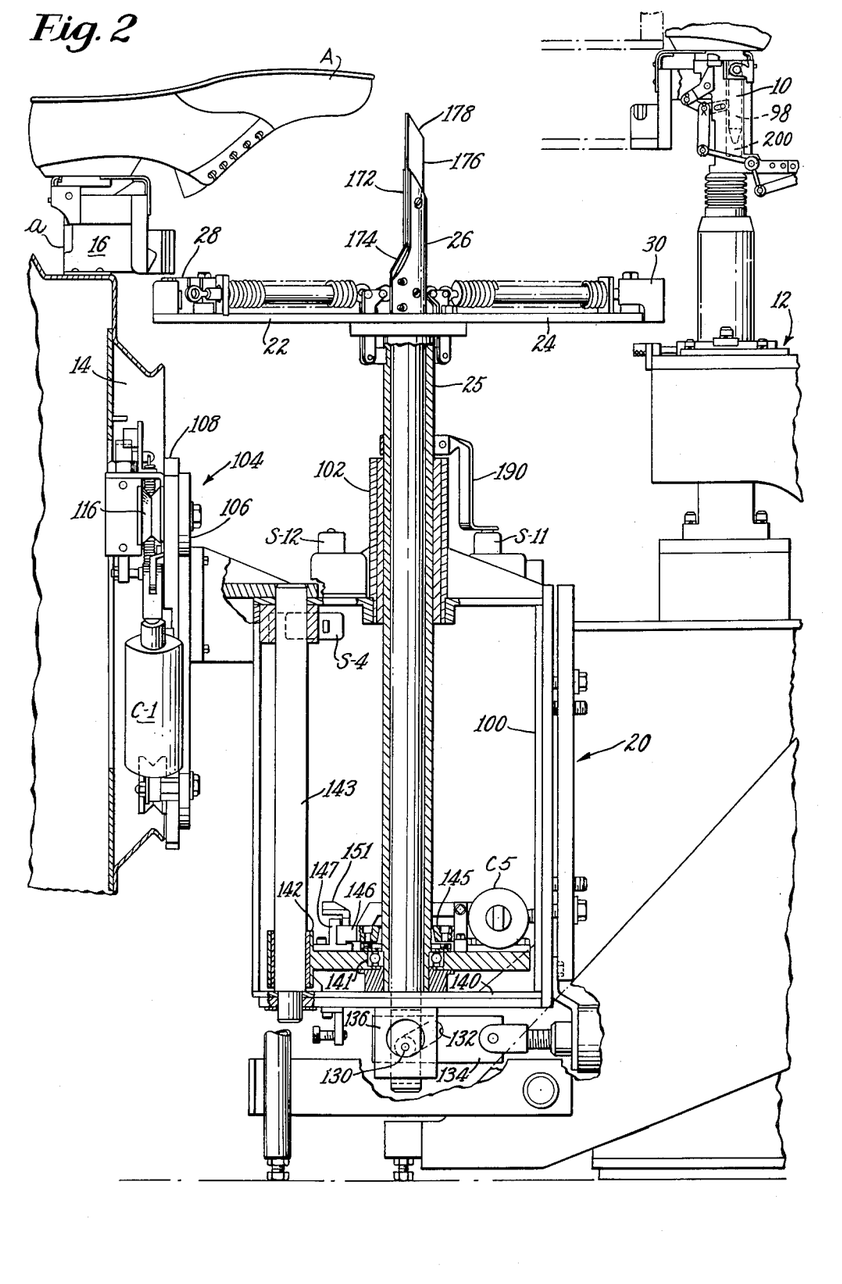
FIG. 2 is a view in side elevation of the transfer mechanism just prior to the start of the first transfer cycle.
Figure 3:
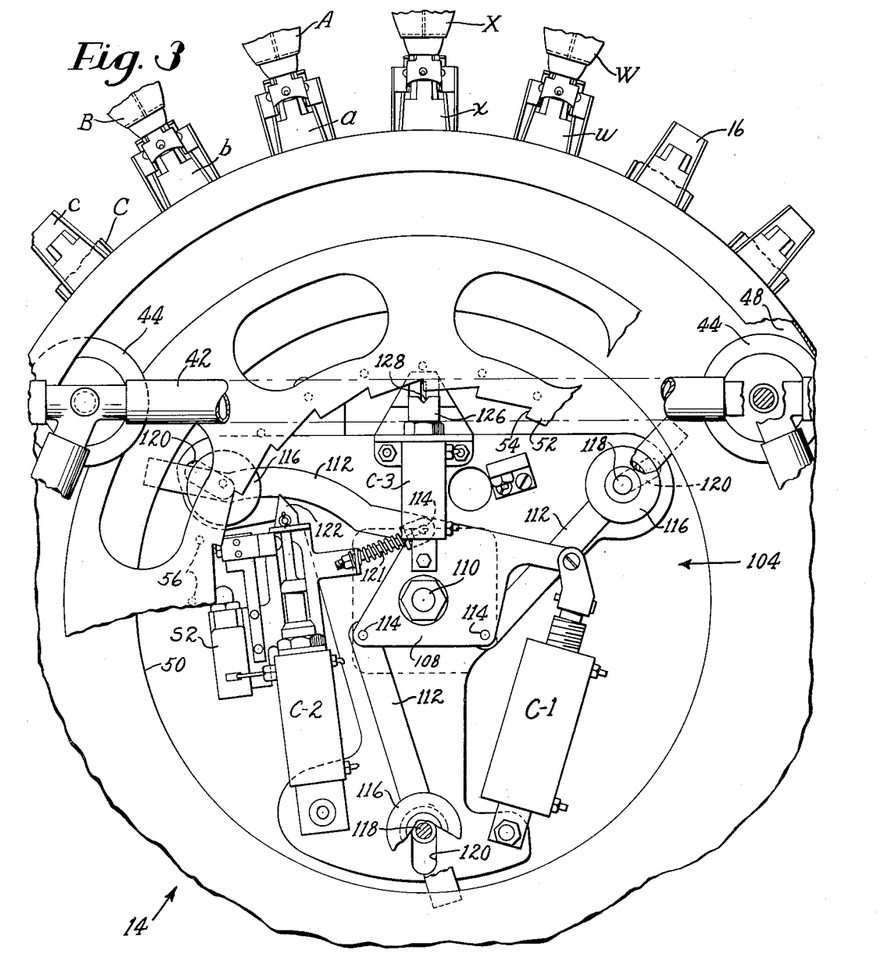
FIG. 3 is a front view of the storage rack illustrated in FIG. 1, as positioned in front of the transfer mechanism, by an operator, prior to the actuation of the rack pick-up mechanism.
Figures 4, 5, 6:
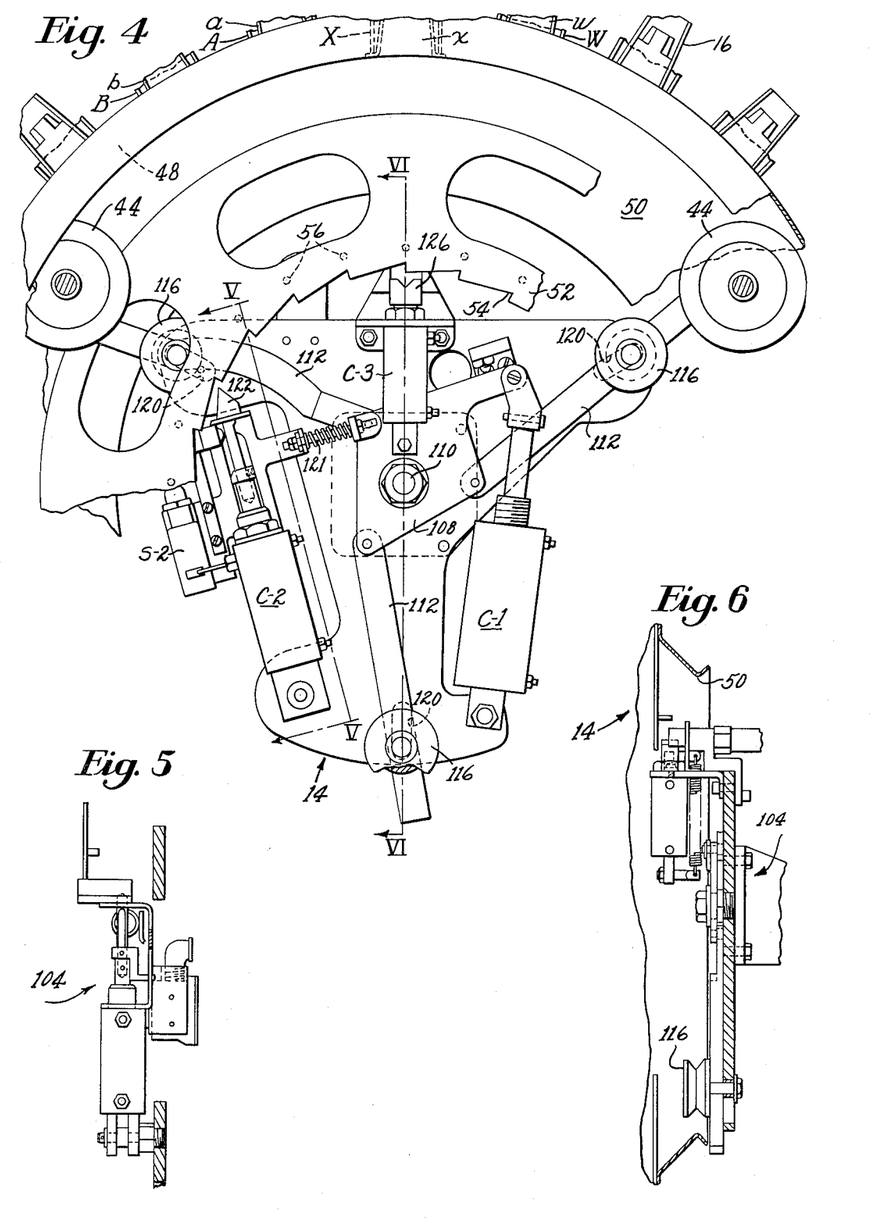
FIG. 4 is a view similar to FIG. 3, after the rack has been lifted from the rack support by the rack pick-up mechanism.
FIG. 5 is a view in section taken on line 5—5 of FIG. 4.
FIG. 6 is a view in section taken on line 6—6 of FIG. 4.

Switches S-11 and S-12 are provided on the frame of the transfer mechanism, so positioned that when the arms are at level H-1 with arm 22 extending toward the rack and arm 24 extending toward the machine, as in FIG. 2, a bracket 190 secured to shaft 25 maintains switch S-11 depressed (with the circuit thereto being in the condition shown in FIG. 24) and with switch S-12 being released. When the arms have reversed their position, as will be described hereinafter, the bracket will hold switch S-12 depressed, with S-11 being released.

As previously mentioned, switches S-4 and S-5 are positioned so that one of them will be actuated by the cam 151 on the rack 146 as the rack, shaft 25, and arms arrive at level H-4 on their upward movement and the other will be operated by the cam 151 after the arms have rotated through 180° and the rack comes to the end of its travel. Whether switch S-4 or S-5 will be operated first depends on the orientation of the arms when the machine starts.

To detect the presence of a shoe and last on the arm moving into the machine, switches S-11 and S-12 are positioned to be actuated on alternate cycles of the transfer mechanism by the shoe being carried into the machine. Although in the illustrated embodiment the switches S-11 and S-12 are mounted on the machine 12, they are part of the control circuit of the transfer mechanism, as will appear hereinafter.

Figures 24, 25:
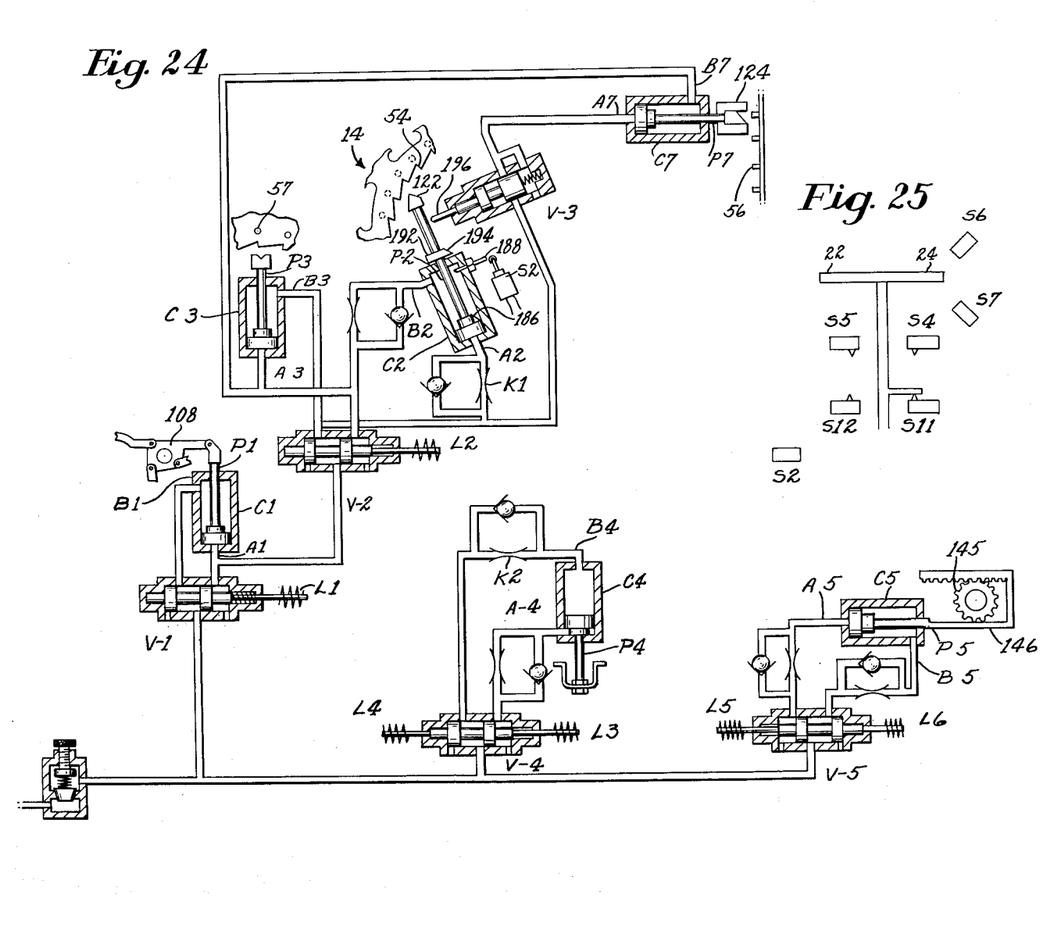
FIG. 24 is a schematic diagram of the pneumatic circuit of the device.
FIG. 25 is a schematic showing of the relative positions of the various switches controlling the operation of the machine.

As illustrated in FIG. 24, the pneumatic cylinders are actuated by valves controlled by solenoids as follows:

Valve V-1 is normally biased to the position shown, to admit pressure to connection B-1 of rack pick-up cylinder C-1, to maintain the rack pick-up arms in the retracted positions, and is shifted to the opposite position by energization of solenoid L-1.

Valve V-2 is normally biased to the position shown, so that when valve V-1 is shifted, valve V-2 admits pressure directly to connection B-3 of cylinder C-3 to maintain the rack locking piston P-3 in the retracted position, and admits pressure through restriction K-1 to connection A-2 of cylinder C-2 to actuate the rack indexing piston P-2; and admits pressure to valve V-3 which is normally biased to a closed position. Piston P-2 is provided with a member 192 having a cam surface 194 positioned to depress plunger 196 of valve V-3 when piston P-2 is extended, thereby shifting valve V-3 to admit pressure to connection A-7 of stop cylinder C-7 to move the abutment 124 into the path of the stop pin 56.

Valve V-4 is controlled by solenoids L-3 and L-4. Energization of solenoid L-3 shifts the valve V-4 to the position opposite to that shown in FIG. 22 to admit pressure to connection A-4 of cylinder C-4 to raise the transfer arms, whereas energization of solenoid L-4 causes the valve V-4 to shift back to the position shown in FIG. 22 to admit pressure to connection B-4 of cylinder C-4 to lower the transfer arm.

Valve V-5 is controlled by solenoids L-5 and L-6. Energization of solenoid L-5 shifts valve V-5 to the position opposite to that shown in FIG. 22 to admit pressure to connection A-5 of cylinder C-5 to cause the transfer arms to rotate 180° in a clockwise direction, whereas energization of solenoid L-6 shifts valve V-5 back to the position shown in FIG. 22 to admit pressure to connection B-5 to rotate the arms in the reverse direction through 180°.

In the illustrated embodiment of the invention, actuation of the machine 12 occurs at the end of the transfer mechanism cycle by energization of solenoid L-7, and actuation of the transfer mechanism on completion of the machine cycle is accomplished by closing of a pressure switch PS-9 in the control panel (not shown) of the transfer mechanism, by pneumatic pressure supplied thereto from the machine at the end of its cycle. The manner in which solenoid L-7 acts to start the machine and the means by which the machine provides pressure to close switch PS-9 on completion of the machine cycle do not form part of the present invention, and are described in a copending application by A. S. Dorosz et al., Serial No. 28,801, filed May 12, 1960.

With the shoe rack in the proper position, power at switch PS and air pressure at the control panel from the machine 10, the electrical circuit is in the condition shown in FIG. 24, except that the pressure switch PS-9 is held closed by the pressure signal from the machine, since the machine is ready to start its cycle.

The arms 22 and 24 may be assumed to be in their lowermost position, at level H-1 (see FIG. 2), with arm 22 extending toward the rack and arm 24 extending toward the machine jack, and the bracket 190 on the shaft 25 resting on switch S-11, so that contact is completed to 11X1 and broken to 11X2.

Valve V-1 is admitting pressure to connection B-1 of cylinder C-1 so that the arms 112 of the rack pick-up mechanism are retracted, and valve V-4 is admitting pressure to connection B-4 of cylinder C-4 holding the transfer arms in the lowermost position. Pressure through valve V-5 to connection B-5 of cylinder C-5 maintains piston P-5 in the fully retracted position.

Figure 22:
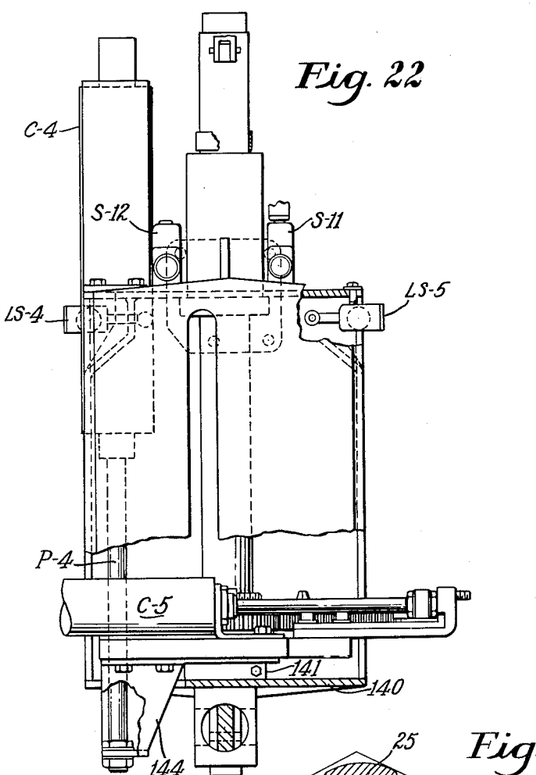
FIG. 22 is a view of the transfer mechanism as seen from the right side of FIG. 2.

The operator then pushes start button PB-2, thereby energizing main control relay R-1 and the rack pick-up control solenoid L-1 which actuates the rack pick-up mechanism by shifting pneumatic valve V-1 to the position opposite to that shown in FIG. 22 admitting pressure to connection A-1 of cylinder C-1, moving the piston P-1 to extend the arms 112 and lift the rack 14 off of the rack support 18.

Switch PB-2 also energizes the latching coil of relay LR-13, which latches contact 13X1 closed to complete a first or main holding circuit to solenoid L-1 and relay R-1.

The energization of relay R-1 closes contacts 1X, thereby energizing relay R-16 through switch S-11 which closes contact 16X1, completing a holding circuit to R–16 through switch S–12, and also closes contacts 16X2, 16X3, 16X4 and 16X5 and opens contact 16X6 to prepare the circuit for subsequent operations, and also energizes relay R–9 through switch PS–9 (which is held closed by the pneumatic pressure from the machine 12) thereby closing contact 9X1.

When valve V–1 shifts on energization of solenoid L–1, the pressure admitted to connection A–1 of cylinder C–1 through valve V–1 is also passed through valve V–2 and restriction K–1 to connection A–2 of cylinder C–2 and to normally closed valve V–3. The restriction K–1 delays the movement of rack indexing piston P–2 until the rack pick-up piston P–1 has substantially reached the end of its stroke, so that when the indexing piston P–2 is actuated the rack is rotatably supported by the rollers of the transfer mechanism.

During the upward stroke of piston P–2 the cam 192 carried thereby depresses plunger 196 thereby shifting valve V–3 to admit pressure to connection A–7 of cylinder C–7, whereby piston P–7 is actuated to move stop abutment 124 into the path of an appropriate stop pin 56 to provide a positive stop to the rotational movement of the rack imparted by the indexing piston.

At the end of the upward stroke of the piston P–2, the cam 186 on the piston actuates switch S–2 through lever 188 energizing solenoids L–2, L–3 and relay R–4.

Relay R–4 closes contacts 4X1 to complete a holding circuit through normally closed contact 6X1 of timing relay TR–6 to solenoids L–2 and L–3, and closes contact 4X2 in the circuit to the machine 12 for a purpose to appear hereinafter.

Energization of solenoid L–2 shifts reversing valve V–2 which admits pressure directly to connection A–3 of cylinder C–3, actuating the rack lock piston P–3 to move locking lug 126 into engagement with a locking pin 57 and reverses the pressure in cylinders C–2 and C–7, allowing piston P–2 to retract to its original position. As indexing piston P–2 returns to its original position, it releases switch S–2 and also permits valve V–3 to return to its original position, which permits piston P–7 to return to its original position.

Hence during this initial part of the operation, the rack has been picked up by the transfer mechanism, rotatably indexed to a transfer orientation, and locked against rotation in either direction, and valve V–4 has been shifted to admit pressure to connection A–4 of cylinder C–4 to start the first transfer cycle.

The actuation of piston P–4 to raise the transfer arm and its associated mechanism is delayed by restriction K–2 so that the rack is locked against rotation by piston P–3 before the transfer arms have moved upwardly an appreciable distance.

As the transfer arms move upwardly, bracket 190 on the center shaft 25, in moving upwardly with the shaft, releases switch S–11 so that the circuit is broken to contact 11X1 and completed to contact 11X2. Since contact 16X5 is now closed, a circuit is completed to relay R–17 which closes contacts 17X1 completing a second or auxiliary holding circuit to rack pick-up control solenoid L–1 and to main control relay R–1; closes contact 17X2, completing a second holding circuit to rack locking solenoid L–2 and to transfer arm lifting solenoid L–3; closes contact 17X3 completing a circuit to timing relay TR–6; and opens contacts 17X4 in the machine actuating circuit.

Energization of timing relay TR–6 immediately opens normally closed contact 6X1 which has no immediate effect on the circuits to solenoids L–2 and L–3 and relay R–4, since they are maintained by the holding circuits through contact 17X2. As a result of opening of contact 6X1, in combination with the closing of 17X2, the circuit to solenoid L–2 is now maintained only so long as R–17 is energized. Hence when R–17 is deenergized (which will occur when the transfer arms have again come back to level H–1) the cylinders C–2, C–3 and C–7 will again be actuated to index the rack, as will appear hereinafter.

Energization of timing relay TR–6 also deenergizes solenoid L–3 (to permit subsequent reversal of valve V–3 by solenoid L–4) by closing contact 6X2, which energizes relay R–10, which closes contact 10X1, creating a holding circuit to maintain itself closed, and opens normally closed contact 10X2, thereby breaking the circuit to relay R–9 which opens contact 9X1 in the solenoid L–3 circuit.

As the arms 22 and 24 are raised by the piston P–4, arm 22 grasps shoe A from the rack at level H–2, as previously described. When the arms reach level H–4, cam 151 on the rack closes switch S–4 which (1) starts the transfer arms rotating in a clockwise direction (as seen from the top) and (2) prepares the circuits so that the operation of the transfer mechanism will be stopped if no shoe is carried into the machine by arm 22, in the following manner: closing of switch S–4 energizes solenoid L–5 which shifts valve V–5 to admit pressure to connection A–5 of cylinder C–5 which extends piston P–5 to move rack 146 in slide 147, thereby rotating the shaft 25 and the arms 22 and 24. As the arms start to rotate, switch S–4 is again opened and solenoid L–5 deenergized.

If no shoe is carried into the machine by the arm 22 (or, on the alternate cycle, by arm 24), it is desirable to stop the operation of the transfer mechanism when the transfer arms have returned to level H–1 at the end of the cycle. For this purpose, the closing of switch S–4 also energizes the unlatching coil of latching relay LR–13, thereby opening contact 13X1.

Hence, as the arms rotate, the circuit to the rack pickup cylinder C–1 and the main control relay R–1 is maintained only so long as R–17 is energized, holding contact 17X1 closed. Since R–17 will be deenergized when the arms reach the end of their cycle and come to rest at level H–1, the operation will stop, unless contact 13X1 is closed before this time. In order that 13X1 will be closed only if a shoe is carried into the machine, switch S–6 (and parallel switch S–7 for the alternate counterclockwise cycle) are so positioned that it is closed by the shoe on arm 22 as the arm rotates into the machine 12, but will not be closed if no shoe is carried by the arm. If switch S–6 is closed by shoe A, relay R–18 is energized to close contact 18X1, energizing the latching coil of latching relay LR–13 closing contact 13X1 to again complete the first holding circuit to the main circuit control relay R–1 and the rack pick-up solenoid L–1, and also closes contact 18X2, so that a circuit will be completed to the machine actuating solenoid L–7 when the transfer arms complete their cycle and reach level H–1, deenergizing R–17 to close 17X4, as will appear hereinafter.

As the arm reaches the end of its desired rotation under the impetus of piston P–5, cam 151 on rack 146 closes switch S–5, thereby actuating transfer arm lowering solenoid L–4 to reverse the position of valve V–3 to admit air to the connection B–4 of cylinder C–4 thereby causing the piston P–4 and the transfer arm to start moving downwardly. At level H–3 (see FIG. 16) of its downward movement the last carrier carrying shoe A is deposited on the jack 10 of the machine, and the arms continue moving downwardly, to level H–1 where the bracket 190 depresses switch S–12, which shifts the switch contact from 12X1 to 12X2, thereby (1) causing indexing of the rack to bring the next rack station into the uppermost or transfer position, and (2) initiating the operation of the machine 12, and (3) resets the contacts of relays R–14 and R–16 so that on the next cycle of the transfer arms, although switch pairs S–11 and S–12, and S–4 and S–5 will be operated in reverse order, the sequence of operation of the mechanism will be the same, except that the arms will be rotated counterclockwise.

For this purpose switch S–12, in breaking the circuit to contact 12X1, (1) Deenergizes relay R–16 by opening the holding circuit through 16X1,
(2) Opens contact 16X2 and 16X3 and 16X4,
(3) Opens contact 16X5, thereby deenergizing relay R–17,
(4) Closes contact 16X6, energizing relay R–14.

The energization of relay R–14, in combination with the deenergization of relay R–16, resets the appropriate contacts so that whereas in the previous cycle the switch S–4 was actuated when the arms reached level H–4 to cause the arms to rotate in a clockwise direction, on this cycle, the cam 151 is at the opposite end of its travel, switch S–5 will be operated when the arms reach level H–4 to cause the arms to rotate in a counterclockwise direction. For this purpose the energization of relay R–14 closes contact 14X1 to create a holding circuit through contact 11X2 of switch S–11, and also closes contacts 14X2, 14X3, 14X4, 14X5, and opens contact 14X6.

The deenergization of relay R–17 closes contact 17X4, thereby energizing solenoid L–7 to start the operation of the machine 12, closes 17X1 to reestablish the auxiliary holding circuit to the main control relay R–1, opens 17X2 breaking the circuit to relay R–4 and solenoid L–2 to actuate the rack indexing mechanism as will appear hereinafter, and opens contact 17X3 breaking the circuit to timing relay TR–6.

TR–6, on deenergization, allows contact 6X1 to close after a short interval (after 4X1 has opened by reason of the deenergization of relay R–4), and allows 6X2 to open.

The deenergization of solenoid L–2 actuates the rack indexing mechanism to bring shoe B to the transfer position as follows:

On deenergization of solenoid L–2, valve V–2 returns to its original position, admitting pressure directly to connection B–3 of cylinder C–3 thereby immediately retracting the locking lug 126 and also again admits pressure through restriction K–1 to connection A–2 of cylinder C–2, to index the rack, as hereinbefore described, to bring shoe B to the transfer position and to close switch S–2, energizing relay R–4 and solenoid L–2 to shift valve V–2 to retract the indexing piston P–2 and extend the locking piston P–3 as before.

However, at this time the machine 12 has started its operation and has released the pressure which has been holding switch PS–9 closed. Hence the closing of contact 4X1 by relay R–4 does not energize solenoid L–3 to start raising the transfer arm as before, since the open switch PS–9 has deenergized relay R–9 opening contact 9X1. The transfer mechanism is therefore inactive until the machine has completed its operation on shoe A.

When the machine 12 has completed its operation on shoe A, it reestablishes the pressure signal to close switch PS–9, energizing relay R–9, closing contact 9X1, energizing solenoid L–3 to shift valve V–3 to raise the transfer arm as before.

As the arms start upwardly on their second cycle, switch S–12 which has been held down by the bracket 190 on the transfer shaft 25 is released so that the contacts of switch S–12 return to the position shown in FIG. 24, whereby the circuit to contact 12X2 is broken and the circuit to 12X1 is completed.

Breaking the circuit to 10X2 does not deenergize relay R–14, since the circuit thereto is maintained through switch S–11.

Completing the circuit to 10X1:

A. Again energizes relay R–17 which—
(1) closes 17X1 to establish the alternate holding circuit to the rack pick-up solenoid L–1;
(2) closes 17X2 to establish the auxiliary holding circuit to the rack locking cylinder solenoid L–2 and the arm raising cylinder solenoid L–3;
(3) opens contact 17X4 so that on subsequent closing of contact 18X2 by switch S–7 when the shoe and last swing into the jack, the starting signal will not be sent to the machine 12 until the arm has completed its downward movement to depress switch S–11 as will appear hereinafter;
(4) closes contact 17X3 which energizes timing relay TR–6;

B. The energization of timing relay TR–6—
(1) opens switch 6X1, so that the rack locking solenoid is now energized only through 17X2, so that indexing will be accomplished when R–17 is deenergized when the arms have again come down to level H–1;
(2) closes switch 6X2, energizing relay R–10;

C. The energization of relay R–10—
(1) establishes a holding circuit to R–10 by closing 10X1;
(2) opens contact 10X2, deenergizing relay R–9 which opens contact 9X1 to deenergize solenoid L–3.

As the arms travel upwardly, at level H–2 arm 24 extending toward the rack depresses the spring arm 68 to unlock the last carrier to remove shoe B from the rack, and at level H–3 the arm 22 lifts the shoe A off of the jack 10 in the manner described hereinbefore.

When the arms reach level H–4, the cam 151 on the rack 146 depresses switch S–5, which energizes solenoid L–6 shifting valve V–5 to admit pressure to connection B–5 of cylinder C–5 to rotate the transfer arms counterclockwise as seen from above. Switch S–5 also energizes the unlatching coil of latching relay LR–13, breaking the holding circuit to the rack pick-up solenoid L–1 and the main control relay R–1, so that while the arm is rotating only the holding circuit through 17X1 is completed.

On this cycle of the transfer mechanism, the shoe B on arm 24 momentarily depresses switch S–7 as it swings into the machine, and, as in the previous cycle, relay 18 is energized which—
(1) Energizes relay R–13 to again complete the main holding circuit by closing contact 13X1;
(2) Closes contact 18X2 to prepare the machine actuating circuit for actuation when the transfer arms reach the bottom of travel at the end of their cycle.

At the end of the rotation of the arms, the cam 151 on the rack 146 depresses switch S–4 which energizes solenoid L–4, shifting valve V–4 to reverse the pressure in cylinder C–4 to start the transfer arms moving downwardly.

As the arms start down, switch S–4 is released, deenergizing solenoid L–4 and the unlatching coil of latching relay LR–13 as the arms pass level H–3, shoe B is deposited on the jack 10, as they pass level H–2, shoe A is returned to the station on the rack previously occupied by shoe B.

When the arms reach level H–1, bracket 190 depresses switch S–11, which deenergizes R–14 to—
(1) Energize R–16 through S–11 and 14X6 to again reverse the circuits of R–14 and R–16;
(2) Deenergize R–17 to close 17X4 to complete the circuit to solenoid L–7 to start the machine 12, and
(3) Breaks the circuit to TR–6 to actuate the rack index mechanism as hereinbefore described to bring shoe C to the transfer position.

As the machine starts, it releases the pressure to switch PS–9, allowing it to open so the transfer mechanism is again inactive until the machine 12 has completed its operation.

The transfer mechanism continues to operate through alternate clockwise and counterclockwise cycles until the vacant rack station, originally occupied by shoe A, is at the transfer station. On the next cycle, no shoe is carried into the machine by arm 22 as shoe X is carried out by arm 24 hence switch S–6 is not depressed as the arms rotate so that R–18 is not energized, 18X1 is not closed, so that the latching coil of LR–13 is not energized, and 13X1 is not closed to reestablish the main holding circuit to the rack pick-up solenoid L–1 and the main control relay R–1.

Hence, as the arms arrive at level H–1, after having deposited shoe X on rack station A, bracket 190 depresses switch S–12, thereby deenergizing relay R–17. Contact 17X1 thereby opens, deenergizing relay R–1 to open main circuit contact X1 and deenergizing solenoid L–1, which permits valve V–1 to return to the position shown in FIG. 24, thereby reversing the pressure in cylinder C–1 to retract piston P–1, causing rotation of crank plate 108 to retract arms 112, thereby lowering the rack back onto the rollers 44 of the rack support.

The rack and rack support may thereafter be removed by the operator and another rack and rack support positioned in front of the transfer mechanism as previously described.

Since the operation of the device is entirely automatic, the operator need not remain at the machine after the start button is pushed.

It will be noted that in the illustrated embodiment, the rack station, which is in the uppermost or transfer position, is lower than the work station on the machine jack 10, so that the amount of upward movement of the arms after passing the level of the work station will be as little as possible, so that the throat dimension of the machine can be as small as possible. If there were no shoe and last on the rack other than the one at the transfer station, the rack station and the work station could be at the same elevation with the amount of upward movement of the shoe and last at the work station being only the distance necessary to permit the guide post to clear the jack aperture. However, the presence of the adjacent shoes and lasts on the rack requires that the shoe and last being removed from the rack be moved upwardly an additional distance to clear some adjacent shoes when the arms are rotated. Hence the rack and rack pick-up mechanism are designed so that the uppermost rack station is lower than the work station on the jack by at least this additional distance.

Although in the illustrated embodiment the rack 14 is circular, with the arms horizontal, it will be understood that storage racks of other configurations may be utilized if desired.

Since certain other obvious changes may be made in the devices without departing from the scope of the invention, it is intended that all matter contained herein be interpreted in an illustrative and not a limiting sense.

Having thus described our invention, what we claim as new and desire to secure by Letters Patent of the United States is:

1. Work handling apparatus for supplying work pieces to a work station and removing them after a desired operation has been performed thereon comprising a rack for retaining a plurailty of work pieces, said rack being capable of being indexed into a plurality of positions to present individual work pieces into a transfer position, transfer means for substantially simultaneously transferring a work piece from the transfer position on the storage rack to the work station and transferring a work piece from the work station to the storage rack, and means actuated by said transfer means for indexing said storage rack to bring a new work piece into the transfer position.

2. Work handling apparatus for supplying work pieces to a work station and removing them after a desired operation has been performed thereon comprising a rotatable rack having peripheral means for retaining a plurality of work pieces, said rack being capable of being indexed into a plurality of positions to prevent individual work pieces to a transfer position, transfer mechanism for substantially simultaneously interchanging work pieces between the transfer position and the work station, said transfer mechanism having work piece engaging means adapted to remove a work piece from the transfer position, and transfer it in a generally horizontal plane to the work station, and means actuated by the transfer means for indexing the rack.

3. Work handling apparatus for supplying work pieces to a work station comprising a rack having a plurality of stations for carrying work pieces, a rack carrier adapted to support said rack and position it in relation to the work station and a transfer mechanism for removing work pieces from the rack and transferring them to a work station, said transfer mechanism having means adapted to lift the rack from the rack carrier and support it for indexing movement, and means for indexing said rack to bring successive stations to a transfer position.

4. Work handling apparatus for supplying work pieces to a work station comprising a rack having a plurality of stations disposed about its periphery for receiving work pieces, a rack carrier for supporting said rack so that the plane of said stations is substantially vertical, rack positioning mechanism having means for lifting said rack from the rack carrier and supporting it so that it is rotatable about a horizontal axis, means for indexing said rack to bring successive work stations to a transfer position, transfer means adapted to lift a work piece from the rack at the transfer station and move it in a horizontal plane to the work station, and means actuated by said transfer means for actuating said indexing means.

5. Work handling apparatus for supplying work pieces to a work station comprising a transfer mechanism positionable in relation to a work station, and a rack carrier positionable in relation to the transfer mechanism, a rack carried by said rack carrier, said rack having a plurality of peripherally positioned work piece stations, said transfer mechanism having means for lifting said rack from the rack carrier and supporting it rotatably, means indexing said rack to bring successive work pieces into a transfer position, transfer means for interchanging work pieces between the transfer position and the work station, said transfer means being actuated by the completion of an operation at the work station, and said rack indexing means being actuated by the completion of the interchange operation.

6. A work handling mechanism comprising a rack, said rack having a circular rim provided with a plurality of work stations, a rack support having a pair of spaced rollers rotatably supporting said rack so that the axis thereof is generally horizontal, and a transfer mechanism adapted to remove work pieces from the rack and transfer them to a work station, said transfer mechanism comprising three rollers movable radially in relation to a central axis to peripherally engage the rack and lift it off the rollers of the rack support.

7. A transfer mechanism for transferring work pieces to a work station from a generally circular work piece storage rack having work piece stations disposed about the outer periphery comprising means for rotatably supporting said rack, means for indexing said rack to bring successive work pieces to a transfer position, and transfer means adapted to lift a work piece from the station in the transfer position and transfer it to the work station.

8. A transfer mechanism for transferring work pieces from a generally circular work piece storage rack having work piece stations disposed about its outer periphery comprising means for rotatably supporting said rack so that the work stations are in a substantially vertical plane, means for indexing said rack to bring successive work stations to a transfer position, means for removing a work piece from the uppermost work station and transferring it to a work station, and means actuated by the operation of said last-named means for indexing said rack.

9. A transfer mechanism for removing work pieces from a storage rack and transferring them to a work station comprising a support, work piece transfer means disposed on the support and work piece engaging means disposed on the transfer means, said transfer means being movable vertically and horizontally in a predetermined sequence to effect the transfer operations, and means responsive to the vertical movement of said transfer means to actuate said work piece engaging means.

10. A transfer mechanism for interchanging work pieces between two work holding stations comprising support means, outwardly extending members disposed in the support means, work piece grasping means disposed on the members, means for swinging said members in a horizontal plane between a first position where each member is oriented to a work piece holding station, and a second position in which each arm is oriented to a different work holding station than it was in the first position, means for causing vertical movement of the arms while oriented to the work stations, and means responsive to said vertical movement for actuating said work grasping means.

11. A transfer mechanism for interchanging work pieces between two work holding stations comprising support means, radial arms on the support means which are rotatable and movable vertically in relation to the support means, work piece grasping means disposed on the arms, means for rotating said arms about the support axis so that they are oriented into transfer positions, means associated with each transfer position for actuating the work grasping means of the arm oriented thereto.

12. A transfer mechanism for interchanging work pieces between work holding stations at different elevations, comprising support means, a pair of arms on the support means which extend radially therefrom and are movable vertically and rotatable in relation thereto into transfer positions in relation to said stations, means associated with each work holding station for actuating the work grasping mechanism of the arm disposed in transfer relation thereto at a predetermined elevation in response to vertical movement of said arm.

13. A transfer mechanism for transferring work pieces from a storage rack to a work station comprising work piece grasping means movable in sequence past a rack station and the work station, means responsive to movement of said work piece grasping means past each station in one direction to grasp a work piece and remove it from the station, and means responsive to movement of said work piece grasping means in another direction to release a work piece carried thereby onto the station.

14. A transfer mechanism for transferring work pieces from a storage rack to a work station comprising work piece grasping means movable in sequence upwardly past a rack station and downwardly past the work station, and means responsive to upward and downward movement of said work piece grasping means past said stations which respectively engages and releases a work piece.

15. A transfer means for transferring work pieces from a storage rack at one level to a work station at a higher level comprising work piece grasping means movable in sequence upwardly past a rack station to a level higher than the work station, laterally, and then downwardly past the work station to a level lower than the rack station, and means responsive to upward and downward movement of said mechanism which respectively engages and releases a work piece.

16. A transfer mechanism for removing work pieces from a storage rack and transferring them to a work station comprising a center shaft having a pair of cam tracks each including a cam rise, a transfer arm disposed on the shaft and having work piece grasping means on the outer end and cam means on the inner end for actuating said work piece grasping means, said arm being rotatable on said center shaft so that when the arm extends toward the rack the cam means is disposed on one cam track, and when the arm extends toward the work station the cam means is disposed on the other cam track, said arm being movable vertically on said center shaft so that the work grasping means is actuated by the cam rise on the cam track on which the cam means is disposed.

17. A transfer mechanism for removing work pieces from a storage rack and transferring them to a work station comprising a center support shaft having a first cam track including a cam rise facing the storage rack and a second cam track including a cam rise facing the work station, a transfer arm disposed on the shaft and having work piece grasping means on the outer end and cam means on the inner end for actuating said work grasping means, said arm being rotatable on said center shaft so that when the arm extends toward the rack, the cam means is disposed on said first cam track, and when the arm extends toward the work station, the cam means is disposed on said second cam track, said arm being movable vertically on said center support shaft so that the work grasping means is actuated by the cam rise on the cam track on which the cam means is disposed.

18. A transfer mechanism for interchanging work pieces between a work station and a storage rack having a plurality of work stations comprising a center shaft, a pair of outwardly extending arms disposed therein which are movable vertically and oscillatable so that each arm extends alternately toward the rack and the work station, work piece grasping means on each arm, and a pair of work piece grasping means actuating means associated therewith, one actuating means being adapted to actuate the work piece grasping means on the arm extending toward the rack during movement thereof past the rack station, the other actuating means being adapted to actuate the work piece grasping means on the arm extending toward the work station during movement thereof past the work station.

References Cited in the file of this patent
UNITED STATES PATENTS

| | | |
|---|---|---|
| 1,703,190 | Glidden | Feb. 26, 1929 |
| 2,790,555 | Horchner | Apr. 30, 1957 |
| 2,903,722 | McConchie | Sept. 15, 1959 |
| 2,965,909 | Quinn et al. | Dec. 17, 1960 |